(12) United States Patent
Tölli et al.

(10) Patent No.: US 7,342,911 B2
(45) Date of Patent: Mar. 11, 2008

(54) NETWORK ELEMENT AND A METHOD FOR TRAFFIC MANAGEMENT

(75) Inventors: Antti Tölli, Málaga (ES); Jorge Navarro Ortiz, Malaga (ES); Héctor Montes Linares, Granada (ES)

(73) Assignee: Nokia Corporation, Espoo (FI)

( * ) Notice: Subject to any disclaimer, the term of this patent is extended or adjusted under 35 U.S.C. 154(b) by 892 days.

(21) Appl. No.: 10/615,406

(22) Filed: Jul. 9, 2003

(65) Prior Publication Data

US 2004/0228317 A1  Nov. 18, 2004

(30) Foreign Application Priority Data

May 13, 2003  (FI) .................................. 20030712

(51) Int. Cl.
*H04J 3/00* (2006.01)
(52) U.S. Cl. ..................... 370/345; 370/458; 370/498
(58) Field of Classification Search .............. 370/345, 370/229, 498, 458; 455/453, 448, 452.2, 455/447; 450/453
See application file for complete search history.

(56) References Cited

U.S. PATENT DOCUMENTS

| | | | |
|---|---|---|---|
| 6,370,117 B1 * | 4/2002 | Koraitim et al. ............ 370/232 |
| 6,714,546 B1 * | 3/2004 | Watanabe et al. ......... 370/395.2 |
| 6,788,943 B1 * | 9/2004 | Hamalainen et al. ........ 455/450 |
| 6,813,252 B2 * | 11/2004 | Chang et al. ............... 370/294 |
| 7,114,000 B1 * | 9/2006 | Manian et al. .............. 709/232 |
| 7,133,418 B1 * | 11/2006 | Macridis et al. ............ 370/468 |
| 7,248,571 B1 * | 7/2007 | Ilas et al. .................... 370/336 |
| 2002/0105906 A1 * | 8/2002 | Marjelund et al. .......... 370/229 |

FOREIGN PATENT DOCUMENTS

| | | |
|---|---|---|
| EP | 0 841 763 A1 | 5/1998 |
| EP | 1 059 740 A1 | 12/2000 |
| EP | 1 306 985 A1 | 5/2003 |
| EP | 0 841 763 B1 | 12/2003 |

* cited by examiner

*Primary Examiner*—George Eng
*Assistant Examiner*—Brandon J. Miller
(74) *Attorney, Agent, or Firm*—Squire, Sanders & Dempsey L.L.P.

(57) ABSTRACT

A traffic management method includes the steps of dividing a time slot into sub-blocks, defining the amount of available capacity for non-real time use in a time slot, defining the number of sub-blocks reserved by real time use in a time slot, defining the number of sub-blocks reserved by non-real time use in a time slot, defining the number of free sub-blocks in a time slot on the basis of sub-blocks reserved by real time use and sub-blocks reserved by non-real time use, calculating a sub-block reservation rate for a time slot and averaging a sub-block reservation rate for a time slot to get down link sub-block reservation rate.

18 Claims, 3 Drawing Sheets

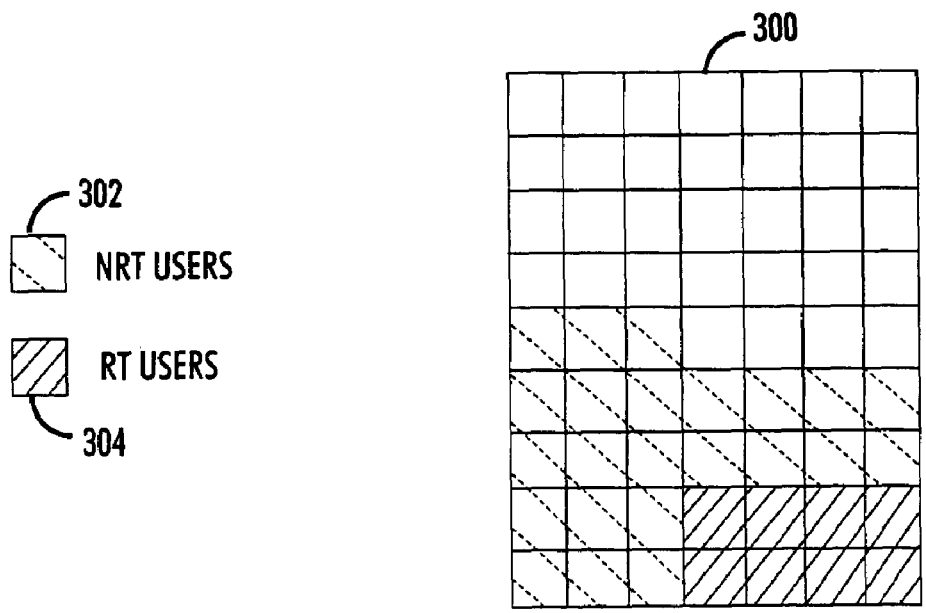
Fig. 3A
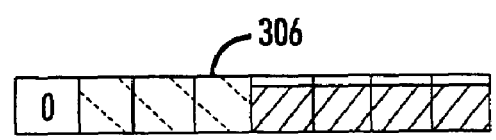
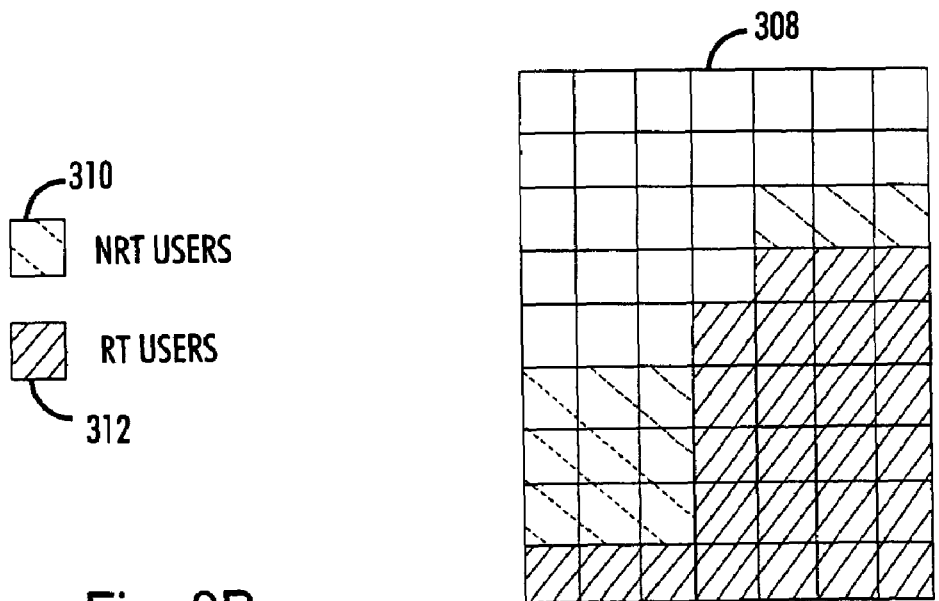
Fig. 3B
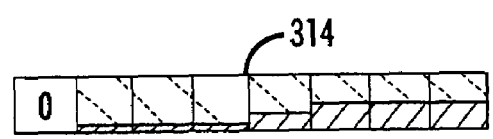

NETWORK ELEMENT AND A METHOD FOR TRAFFIC MANAGEMENT

BACKGROUND OF THE INVENTION

1. Field of the Invention

The invention relates to a method for traffic management in a radio system and a network element.

2. Description of the Related Art

The increasing number of users and density of mobile terminals together with the need for transferring large amounts of data further increase the demands set for the capacity and management of wireless communication systems. In the future, there will be more and more users of non-real-time (NRT) services, for example interactive users such as web browsers transferring large amounts of information and users transferring data associated with video and audio signals over wireless communication systems. Mainly for this reason, it has been proposed that future wireless communication networks should use several types of radio access technologies instead of just one type of technology, i.e. the use of multisystem networks.

In order to use multisystem or multicarrier (called also multiradio) networks efficiently, it is essential to utilize all the systems or carriers efficiently. Efficiency can be improved, for example, by using trunking, a technique by means of which the capacity of several radio channels is automatically distributed between several users. The trunking efficiency of a network can be improved by introducing load-balancing mechanisms between systems or carriers.

Multisystem radio traffic management is required to balance RT (real time) load and, naturally in pursuance also interference, evenly between cells, thus maximizing the trunking efficiency. For non-real time services in turn the purpose of multiradio traffic management is to balance the NRT load (and/or interference) evenly between cells and thus to maximize the throughput i.e. to minimize the delay experienced by a user. In multisystem environment, trunking gain can be achieved, for example, by directing an RT user and/or NRT user to another system, or to another layer or frequency when the load is heavy thus reducing blocking. A NRT user can also be directed to an adjacent cell of the same layer or system. When real-time services are concerned, directing is typically called handover (HO) but it can also be called network controlled cell reselection (NCCRS).

In the prior art the cell load of the radio cells in a radio system has typically been measured by monitoring occupation of physical resources, interference or throughput or buffer delays. There are, however, several disadvantages associated with using throughput and/or delay measurements to measure NRT load. Especially, the calculation/mapping of delay/throughput values to actual nRT load is problematic mainly because it depends a lot on the system (GPRS/EGPRS, for instance). A problem is also that calculating and mapping depends a lot on the radio conditions (network scenario, frequency reuse, etc.). Additionally, the delay caused by network elements such as SGSN (serving GPRS support node) cannot necessarily be taken into account.

SUMMARY OF THE INVENTION

The invention provides an improved traffic management method in a telecommunication system. According to an embodiment of the invention, there is provided a traffic management method in a telecommunication system. The method includes dividing a time slot into a predetermined number of sub-blocks, defining the amount of available capacity for non-real time use in a time slot, defining the number of sub-blocks reserved by real time use in a time slot, defining the number of sub-blocks reserved by non-real time use in a time slot, defining the number of free sub-blocks in a time slot on the basis of sub-blocks reserved by real time use and sub-blocks reserved by non-real time use, calculating a sub-block reservation rate for a time slot on the basis of the number of free sub-blocks, the amount of available capacity for non-real time use in a time slot and the number of sub-blocks in a time slot not reserved by real time use, averaging a sub-block reservation rate for a time slot to get down link sub-block reservation rate.

According to another embodiment of the invention, there is provided a traffic management method in a telecommunication system. The method includes dividing a time slot into a predetermined number of sub-blocks, defining the amount of available capacity for non-real time use in a time slot, defining the number of sub-blocks reserved by real time use in a time slot, defining the number of sub-blocks reserved by non-real time use in a time slot, defining the number of free sub-blocks in a time slot on the basis of sub-blocks reserved by real time use and sub-blocks reserved by non-real time use, calculating a sub-block reservation rate for a time slot on the basis of the number of free sub-blocks, the amount of available capacity for non-real time use in a time slot and the number of sub-blocks in a time slot not reserved by real time use, averaging a sub-block reservation rate for a time slot to get down link sub-block reservation rate, directing transmission in the telecommunication system to less loaded cells or timeslots.

According to another embodiment of the invention, there is provided a network element, including means for dividing a time slot into a predetermined number of sub-blocks, defining the amount of available capacity for non-real time use in a time slot, defining the number of sub-blocks reserved by real time use in a time slot, defining the number of sub-blocks reserved by non-real time use in a time slot, defining the number of free sub-blocks in a time slot on the basis of sub-blocks reserved by real time use and sub-blocks reserved by non-real time use, calculating a sub-block reservation rate for a time slot on the basis of the number of free sub-blocks, the amount of available capacity for non-real time use in a time slot and the number of sub-blocks in a time slot not reserved by real time use, averaging a sub-block reservation rate for a time slot to get down link sub-block reservation rate.

According to another embodiment of the invention, there is provided a network element including means for dividing a time slot into a predetermined number of sub-blocks, defining the amount of available capacity for non-real time use in a time slot, defining the number of sub-blocks reserved by real time use in a time slot, defining the number of sub-blocks reserved by non-real time use in a time slot, defining the number of free sub-blocks in a time slot on the basis of sub-blocks reserved by real time use and sub-blocks reserved by non-real time use, calculating a sub-block reservation rate for a time slot on the basis of the number of free sub-blocks, the amount of available capacity for non-real time use in a time slot and the number of sub-blocks in a time slot not reserved by real time use, averaging a sub-block reservation rate for a time slot to get down link sub-block reservation rate, directing transmission in the telecommunication system to less loaded cells or timeslots.

According to another embodiment of the invention, there is provided a network element configured to divide a time slot into a predetermined number of sub-blocks, define the amount of available capacity for non-real time use in a time slot, define the number of sub-blocks reserved by real time use in a time slot, define the number of sub-blocks reserved by non-real time use in a time slot, define the number of free sub-blocks in a time slot on the basis of sub-blocks reserved by real time use and sub-blocks reserved by non-real time use, calculate a sub-block reservation rate for a time slot on the basis of the number of free sub-blocks, the amount of available capacity for non-real time use in a time slot and the number of sub-blocks in a time slot not reserved by real time use, average a sub-block reservation rate for a time slot to get down link sub-block reservation rate.

According to another embodiment of the invention, there is provided a network element configured to divide a time slot into a predetermined number of sub-blocks, define the amount of available capacity for non-real time use in a time slot, define the number of sub-blocks reserved by real time use in a time slot, define the number of sub-blocks reserved by non-real time use in a time slot, define the number of free sub-blocks in a time slot on the basis of sub-blocks reserved by real time use and sub-blocks reserved by non-real time use, calculate a sub-block reservation rate for a time slot on the basis of the number of free sub-blocks, the amount of available capacity for non-real time use in a time slot and the number of sub-blocks in a time slot not reserved by real time use, average a sub-block reservation rate for a time slot to get down link sub-block reservation rate, direct transmission in the telecommunication system to less loaded cells or timeslots.

The method and system of the invention provide several advantages. For example, in one embodiment, the invention is capable of providing information on how many RT and NRT users are sharing per timeslot, i.e., cell load information including also NRT users.

BRIEF DESCRIPTION OF THE DRAWINGS

In the following, the invention will be described in greater detail with reference to the preferred embodiments and the accompanying drawings, in which:

FIGS. 3A-B show examples of an embodiment of the invention;

DETAILED DESCRIPTION OF THE PREFERRED EMBODIMENTS

Figure 1:
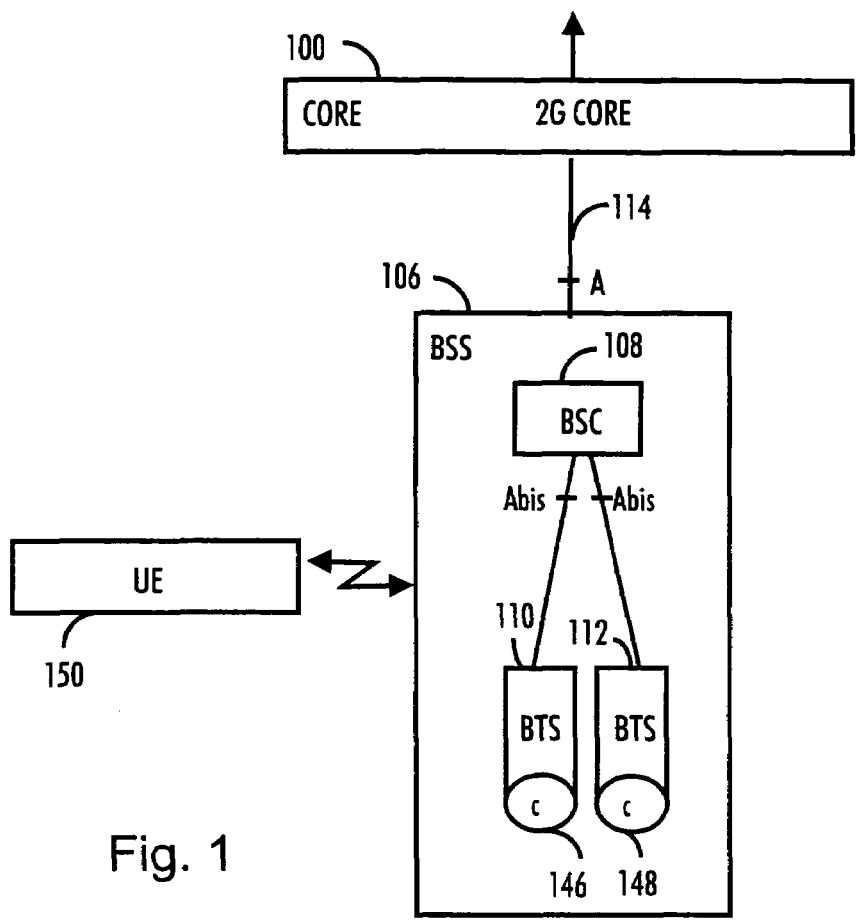
FIG. 1 shows an example of a telecommunication system.

With reference to FIG. 1, a mobile communication network in which embodiments of the invention can be applied is illustrated. FIG. 1 illustrates a simplified radio system, which includes the main parts of a radio system: a core network (CN) 100, radio access networks 106 and user equipment (UE) 150.

In FIG. 1, the radio system of the 2.5 generation radio system is represented by a radio system which is based on the GSM (Global System for Mobile Communications), and which uses the EDGE technique (Enhanced Data Rates for Global Evolution) for increasing the data transmission rate, and which can also be used for implementing packet transmission in the GPRS system (General Packet Radio System).

The Base Station Subsystem (BSS) 106 based on the GSM includes a base station controller (BSC) 108 and base transceiver stations (BTS) 110, 112. The base station controller 108 controls the base transceiver stations 110, 112. The interface 114 between the core network 100 and the BSS 106 is called A. The interfaces between the BSC 108 and BTS 110, 112 are called A-bis. Generally the devices implementing the radio path and their functions should be located in the base transceiver station 110, 112 and the management devices in the base station controller 108. Different implementations may however naturally exist.

FIG. 1 also illustrates the coverage areas, i.e. cells, of the base stations of the different radio access networks. Cells 146 and 148 represent the coverage areas of the base stations 110 and 112. Base station 110, 112 may either serve one cell, as illustrated in FIG. 1, or several cells which in the case of base stations, can be sectored cells.

User equipment 150 illustrated in FIG. 1 includes at least one transceiver for establishing a radio connection to the radio access network 106. Typically, user equipment 150 is a mobile station, further including an antenna, a user interface and a battery. Various kinds of user equipment 150 are available, e.g. equipment installed in a car and portable equipment, and user equipment 150 can also have properties similar to those of a personal computer or a portable computer. User equipment 150 is connected to the radio system via the base station and the base station controller, for providing the user with access to the core network of the telecommunications system.

Figure 2:
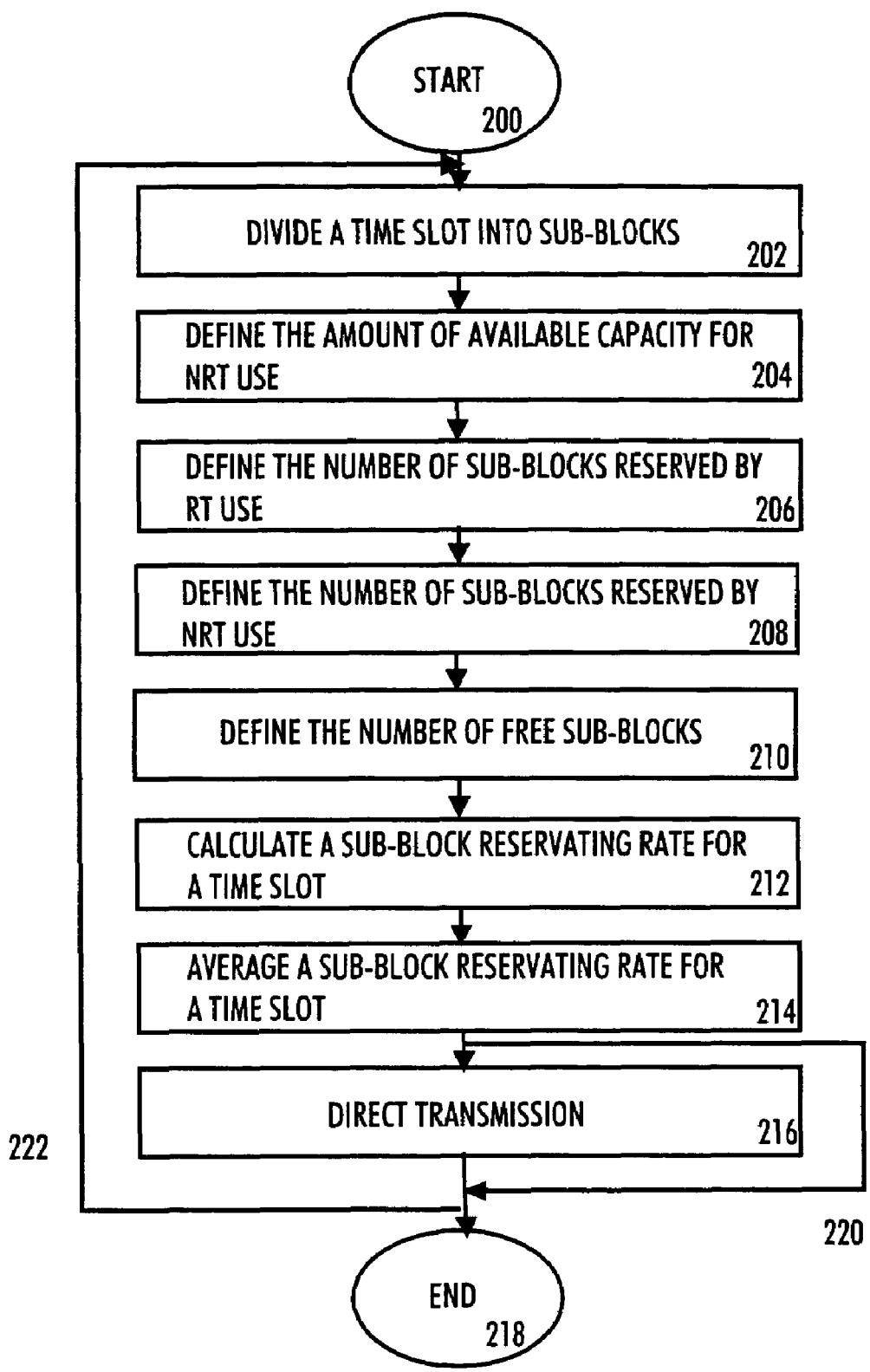
FIG. 2 is a flow chart of a method for traffic management according to one embodiment of the invention.

Next, this embodiment of the invention is described in further details by the aid of FIG. 2. The traffic management method according to the invention is suitable especially for multi-system or multi-carrier systems, where all the system or carriers should be used as efficiently as possible.

Trunking efficiency of a network can be improved by introducing a method to balance the load between different systems or carriers. Trunking gain in a multi-radio environment can be achieved by, for example, directing a real-time (RT) user to other system, layer or frequency when the load is high or directing a non-real time (NRT) user to other system, layer or frequency when the cell throughput is below predetermined threshold, in other words, when delay is too long.

In non-real time services, the purpose of multi-radio traffic management is to balance NRT load (and/or interference) evenly between cells and therefore maximize throughput i.e. minimize delay. NRT load estimation is used in CRRM (common radio resource management or centralized radio resource management) prioritization algorithms to evaluate target cells for NRT services. Also RT load has to be included in target cell evaluation since the probability to acceptable throughput for NRT users is lower when RT load is high.

The main purpose of the traffic management method is to define a sub-block reservation rate for down link. By the aid of the defined sub-block reservation rate it is possible to control cell load and direct users to a suitable (not overloaded) system, layer or frequency. The method starts from block 200.

In block 202, a time slot is divided into a predetermined number of sub-blocks. One example of sub-blocks is TBF sub-blocks. TBF means temporary block flow or temporary GPRS connection block flow. It is used principally in GPRS or EGPRS networks. GPRS means general packet radio service. GPRS is a mobile service which gives packet-switched access over GSM to external data networks. EGPRS in turn means enhanced general packet radio service. It differs from a general packet radio service such that its data rate is increased up to threefold with EDGE (enhanced data rates for GSM evolution) modulation.

TBF typically means a physical connection where multiple mobile stations (MS) share one traffic channel which is dedicated to one MS at a time, meaning that one MS is transmitting or receiving at a time. TBF is maintained only for the duration of the data transfer. Seven uplink and nine downlink TBFs can share the resources of a time slot.

Though the method is explained in a GPRS (or EGPRS) system which uses TBF sub-block division, the application of the method is not restricted to using TBF sub-block division. Thus the number of sub-blocks and other correspondent details can differ from the following example.

In block 204, the amount of available capacity for non-real time use in a time slot (NRT_share_per_TSL$^i$) is defined. This can be done by using the equation $$\text{NRT\_share\_per\_TSL}^j = \max\left(0, 1 - \frac{\sum_{j=0}^{M^i} GBR_j^i}{R_{rb\_est}^i}\right) \quad (1)$$

where
M=the number of real time users per timeslot having a guaranteed bit rate,
GBR means a guaranteed bit rate,
$R_{rb\_est}$=average bit rate per radio block in a time slot,
i means a time slot of interest.

$R_{rb\_est}$ is the average bit rate per radio block in a time slot, accordingly, it is the number of bits transmitted (kbps) in a radio block as estimated by a scheduler divided by block period duration (for instance 20 ms), and averaged over several radio blocks. In the equation (1), another option is to use throughput estimation parameter $Tp_{est}$ instead of $R_{rb\_est}$. Throughput estimation parameter $Tp_{est}$ indicates the minimum throughput that a time slot can provide to guaranteed bit rate (GBR) connections. The parameters are typically set by an operator or they are adaptively estimated.

A real time user can be a guaranteed bit rate user. If the bit rate is guaranteed, the radio management has to take care that the guaranteed resources are allocated to a user even if there is rush (shortage of resources) in a network.

In block 206, the number of sub-blocks reserved by real time use in a time slot is defined. Usually network elements taking care of radio resource management, such as base station controllers, have the knowledge of real time communication in its area.

In block 208, the number of sub-blocks reserved by non-real time use in a time slot is defined. Usually network elements taking care of radio resource management, such as base station controllers, have the knowledge of non-real time communication located in their area.

In block 210, the number of free sub-blocks in a time slot on the basis of sub-blocks reserved by real time use and sub-blocks reserved by non-real time use is defined. The number of free sub-blocks are preferably calculated by using the equation $$\text{Free}TBFs^i = 9 - TBF_{RT}^i - TBF_{NRT}^i \quad (2)$$

where
9 is the number of TBF sub-blocks in a time slot,
$TBF_{RT}^i$ is the number of sub-blocks reserved for real time use,
$TBF_{NRT}^i$ is the number of sub-blocks reserved for non-real time use,
i means a time slot of interest.

If the sub-block division is not TBF sub-block division, the number of sub-blocks per time slot naturally changes.

In block 212, a sub-block reservation rate for a time slot is calculated on the basis of the number of free sub-blocks, the amount of available capacity for non-real time use in a time slot and the number of sub-blocks in a time slot not reserved by real time use. This is preferably done by using the equation $$TBFreservationrate^i = 1 - \frac{9 - TBF_{RT}^i - TBF_{NRT}^i}{\frac{1}{\text{NRT\_share\_per\_TSL}^j} \cdot (9 - TBF_{RT}^i)} \quad (3)$$

where
9 is the number of TBF sub-blocks in a time slot,
$TBF_{RT}^i$ is the number of sub-blocks reserved for real time use,
$TBF_{NRT}^i$ is the number of sub-blocks reserved for non-real time use,
NRT_share_per_TSL$^i$ is the amount of available capacity for non-real time use in a time slot calculated in block 204,
i means a time slot of interest.

It is possible to define reservation rates for a predetermined number of time slots, in other words for one or more time slots.

If the sub-block division is not TBF sub-block division, the number of sub-blocks pre time slot naturally changes.

In block 214, a sub-block reservation rate for a time slot is averaged to determine the down link sub-block reservation rate. The averaging is done within a group, the group including time slots reserved for non-real time use in a cell. The averaging can be done by using the equation $$TBFreservationrateDL = \frac{\sum_{i=0}^{TSL_{total}} TBFreservationrate^i}{TSL_{total}} \quad (4)$$

where
TBFreservationrate$^i$ is calculated according to the equation (3),
i means a time slot of interest,
TSL means a predetermined number of time slots reserved for packet data in a cell. Packet data is typically relayed as non-real time transmission. In GPRS systems this is called a dedicated PS (Packet Switched) territory or GPRS territory. All the packet switched data is directed to this territory. The size of the PS territory can vary according to the load in PS territory in relation to the load elsewhere in a cell.

Another way of calculating down link sub-block reservation rate is by using the equation $$TBFreservationrateDL = \frac{\sum_{i=0}^{TSL_{total}} \text{NRT\_share\_per\_TSL}^j \cdot TBFreservationrate^i}{\sum_{i=0}^{TSL_{total}} \text{NRT\_share\_per\_TSL}^j} \quad (5)$$

where

TBFreservationrate$^i$ is calculated according to the equation (3), i means a time slot of interest, NRT_share_per_TSL$^i$ is the amount of available capacity for non-real time use in a time slot calculated in block 204, TSL means a predetermined number of time slots reserved for packet data in a cell.

In the equation (5) reservation rates per one time slot (equation (3)) are weighted by the NRT users share of the time slot in question.

In equations (1)-(5), the invention takes into account the guaranteed bit rate (real-time) users while determining the TBF reservation rate by estimating how many NRT TBFs are needed for replacing the RT TBFs in order to generate equal bit rate per NRT TBF in the scheduler, while certain number of TBFs are still available for NRT users. In block 216 NRT users are directed to less loaded cells or time slots on the basis of this information. The arrow 220 depicts the possibility to continue the method from beginning and thus define reservation rates for more time slots or cells before directing transmission, for instance.

The method ends in block 218. The arrow 222 depicts one example of repeating the method.

In the following, two application examples of a preferred embodiment of the invention are described with the aid of FIGS. 3A-B and tables 1A-B and 2A-B. The reservation situations as well as other congruent information shown in FIGS. 3A-B or in the tables 1A-B and 2A-B are only examples and they do not restrict the implementation of the invention. In FIGS. 3A-B there is an example of TBF reservation rate calculation for downlink.

In FIG. 3A, a carrier is divided into 8 time-slots one of which (the slot 0) is used as BCCH (broadcast control channel). BCCH is a channel from a base transceiver station to a mobile station used for transmission of messages to all mobile stations located in the base transceiver station area. It is not used as a traffic channel and therefore there are 7 time-slots reserved for traffic. Time slots of one carrier are marked with number 306. There is also depicted the share of RT and NRT traffic per a time-slot: a solid line filling indicates real time, RT, users and a broken line filling indicates non-real time, NRT, users.

All the 7 traffic time-slots are in turn divided into 9 sub-blocks that is shown by the aid of the square 300. Each box indicates one TBF sub-block. The boxes marked with a solid line filling are real time RT users as shown with the reference number 302. The boxes marked with a broken line filling are non-real time NRT users, which is shown with the number 304. There are 24 sub-blocks reserved by NRT users and eight sub-blocks reserved by RT users.

Next the calculation results of equations (1)-(5) using $T_{\rho est}$=30 kbps (throughput estimation parameter $T\rho_{est}$ indicates the minimum throughput that a time slot can provide to guaranteed bit rate (GBR) connections) and according to the example of FIG. 3A are shown in tables 1A-B below. In the table 1A, there are shown parameters and results per each time slot whereas in the table 1B, there are shown averaged TBF reservation rate values.

TABLE 1A

| TSL | 1 | 2 | 3 | 4 | 5 | 6 | 7 |
|---|---|---|---|---|---|---|---|
| GBR/TSL | 0 | 0 | 0 | 24 | 24 | 24 | 24 |
| RT TBF | 0 | 0 | 0 | 2 | 2 | 2 | 2 |
| NRT TBF | 5 | 5 | 5 | 2 | 2 | 2 | 2 |
| NRT_share_per_TSL | 1 | 1 | 1 | 1 | 0.2 | 0.2 | 0.2 |
| TBFreservationrate | 5/9 = 0.56 | 0.56 | 0.56 | 30/35 = 0.86 | 0.86 | 0.86 | 0.86 |

TABLE 1B

| TBFreservationrateDL (linear) | 0.73 |
|---|---|
| TBFreservationrateDL (weighted) | 0.62 |

It can be seen from the tables 1A-B and from FIG. 3A that, for example, in time slot (TSL) 4 30 non-real time users would be required to generate the same load as 2 real time users. It should be noted, that TBF reservation rate is in reality higher than the result calculated by the prior art method, where TBF reservation rate is calculated by dividing the maximum number of available TBFs by currently reserved TBFs. The prior art method would give 0.49 as TBF reservation rate in this example.

In FIG. 3B, a carrier is divided into 8 time-slots one of which (the slot 0) is used as BCCH. BCCH is a channel from a base transceiver station to a mobile station used for transmission of messages to all mobile stations located in the base transceiver station area. It is not used as a traffic channel and therefore there are 7 time-slots reserved for traffic. Time slots of one carrier are marked with number 314. In the example of FIG. 3B, there is also depicted the share of RT and NRT traffic per a time-slot: a solid line filling indicates real time, RT, users and a broken line filling indicates non-real time, NRT, users.

All the 7 traffic time-slots are in turn divided into 9 sub-blocks that is shown by the aid of the square 308. Each box indicates one TBF sub-block. The boxes marked with a solid line filling are real time RT users as shown with the reference number 310. The boxes marked with a broken line filling are non-real time NRT users, which is shown with the number 312. There are 12 sub-blocks reserved by NRT users and 26 sub-blocks reserved by RT users.

Next the calculation results of equations (1)-(5) using $T_{\rho est}$=30 kbps (throughput estimation parameter $T\rho_{est}$ indicates the minimum throughput that a time slot can provide to guaranteed bit rate (GBR) connections) and according to the example of FIG. 3B are shown in tables 2A-B below. In the table 2A there are shown parameters and results per each time slot whereas in the table 2B there are shown averaged TBF reservation rate values.

TABLE 2A

| TSL | 1 | 2 | 3 | 4 | 5 | 6 | 7 |
|---|---|---|---|---|---|---|---|
| GBR/TSL | 4 | 4 | 4 | 10 | 14 | 14 | 14 |
| RT TBF | 1 | 1 | 1 | 5 | 6 | 6 | 6 |
| NRT TBF | 3 | 3 | 3 | 0 | 1 | 1 | 1 |
| NRT_share_per_TSL | 0.87 | 0.87 | 0.87 | 0.67 | 0.53 | 0.53 | 0.53 |
| TBFreservationrate | 0.46 | 0.46 | 0.46 | 2/6 = 0.33 | 0.64 | 0.64 | 0.64 |

TABLE 2B

| TBFreservationrateDL (linear) | 0.52 |
|---|---|
| TBFreservationrateDL (weighted) | 0.50 |

In the example shown in FIG. 3B and in the tables 2A-B, the prior art method, where TBF reservation rate is calculated by dividing the maximum number of available TBFs by currently reserved TBFs, would give a higher TBF reservation rate 0.60 mainly due to the high number of low bit rate GBR (guaranteed bit rate) users, in other words push-to-talk service. A Push-to-talk means establishing a half-duplex voice connection (similarly to a walkie-talkie-system) by selecting a contact or group of contacts.

Figure 4:
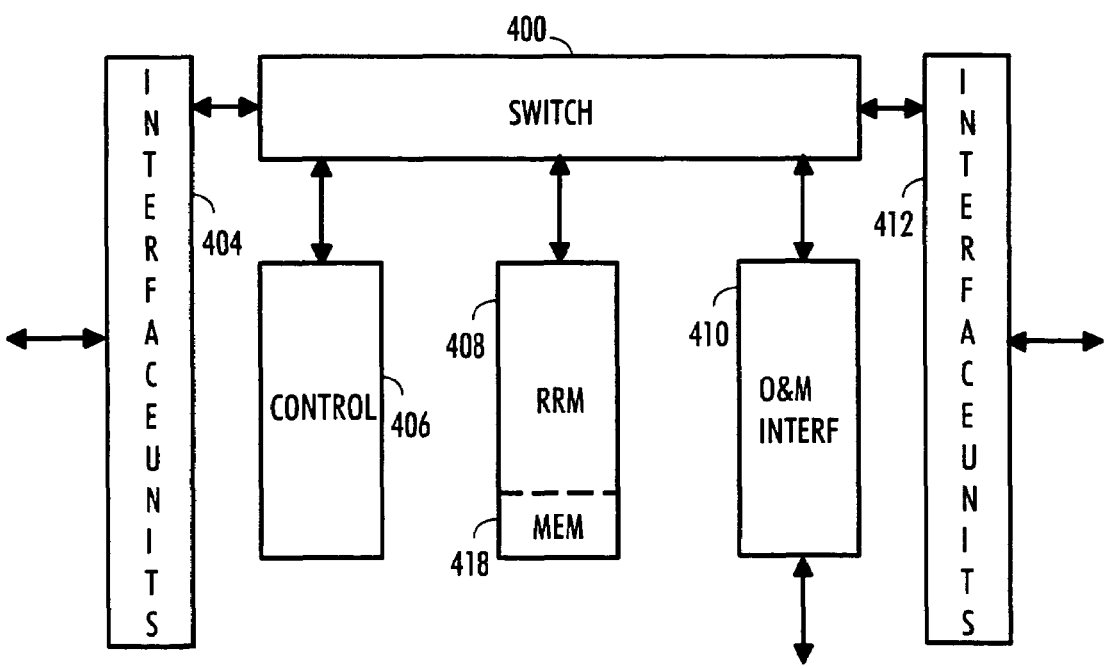
FIG. 4 illustrates an example of a base station controller according to an embodiment of the invention.

FIG. 4 illustrates an example of a base station controller which is one example of a network element according to an embodiment of the invention. The base station controller of FIG. 4 is depicted as a block diagram which illustrates the logical structure of a base station controller. A base station controller is a switching and controlling element of a cellular radio network.

It is obvious for a person skilled in the art that the functions of a base station controller can differ from what is shown in FIG. 4. A base station controller can be implemented in many ways: it can be a separate device belonging to a telecommunication system or it can be a computer program run in an Internet server, for instance, just to mention but a few examples.

The base station controller is the switching and controlling element of the network. The switching unit 400 takes care of the connection between the core network and the user equipment. The base station controller is connected to these interfaces via interface units 404, 412. The precise implementation of the radio network controller is vendor-dependent.

The functionality of a base station controller can be classified into two classes: radio resource management 408 and control functions 406. An operation and management interface function 410 serves as a medium for information transfer to and from the network management functions. The radio resource management is a group of algorithms used to share and manage the radio path connection so that the quality and capacity of the connection are adequate. The most important radio resource management algorithms are handover control, power control, admission control, frequency hopping and packet scheduling. A base station controller has information on free and reserved radio channels and the quality of them. It also processes measurement results made by user equipment or base stations. The radio resource management block therefore typically includes also memory 418. The control functions take care of functions related to the set-up, maintenance and release of a radio connection between the base stations and user equipment.

The disclosed functionalities of the described embodiments of the traffic management method, such as defining a sub-block reservation rate for needed time slots, can be advantageously implemented by means of software which is typically situated in the radio resource management block of a base station controller or of a corresponding device. The implementation solution can also be for instance an ASIC (Application Specific Integrated Circuit) component. A hybrid of these different implementations is also feasible.

Even though the invention is described above with reference to an example according to the accompanying drawings, it is clear that the invention is not restricted thereto but it can be modified in several ways within the scope of the appended claims.

The invention claimed is:

1. A method comprising:
   dividing a time slot into a predetermined number of sub-blocks;
   defining an amount of available capacity for a non-real time use in a time slot;
   defining a number of sub-blocks reserved by a real-time use in a time slot;
   defining a number of sub-blocks reserved by non-real time use in a time slot;
   defining a number of free sub-blocks in a time slot based on the sub-blocks reserved by the real-time use and the sub-blocks reserved by the non-real time use;
   calculating a sub-block reservation rate for a time slot based on the number of free sub-blocks, the amount of available capacity for the non-real time use in the time slot and the number of sub-blocks in a time slot not reserved by real time use; and
   averaging a sub-block reservation rate for a time slot to determine a down link sub-block reservation rate.

2. A method comprising:
   dividing a time slot into a predetermined number of sub-blocks;
   defining an amount of available capacity for a non-real time use in a time slot;
   defining a number of sub-blocks reserved by a real time use in a time slot;
   defining a number of sub-blocks reserved by a non-real time use in a time slot;
   defining a number of free sub-blocks in a time slot based on the sub-blocks reserved by the real time use and the sub-blocks reserved by the non-real time use;
   calculating a sub-block reservation rate for a time slot based on the number of free sub-blocks, the amount of available capacity for the non-real time use in a time slot and the number of sub-blocks in a time slot not reserved by real time use;
   averaging a sub-block reservation rate for a time slot to determine a down link sub-block reservation rate; and
   directing a transmission in a telecommunication system to less loaded cells or timeslots.

3. The method of claim 1, wherein the amount of available capacity for the non-real time use in a time slot is defined by using the equation:

$$\text{NRT\_share\_per\_TSL}^i = \max\left(0, 1 - \frac{\sum_{j=0}^{M^i} GBR_j^i}{R_{rb\_est}^i}\right),$$

where
M=a number of real time users per timeslot having a guaranteed bit rate, GBR means a guaranteed bit rate, $R_{rb-est}$=average bit rate per radio block in a time slot, i means a time slot of interest.

4. The method of claim 1, wherein the sub-block reservation rate for a time slot is defined by using the equation:

$$TBFreservationrate^i = 1 - \frac{9 - TBF_{RT}^i - TBF_{NRT}^i}{\frac{1}{\text{NRT\_share\_per\_TSL}^i} \cdot (9 - TBF_{RT}^i)},$$

where
TBF means temporary block flow,
RT means a real time user,
NRT means a non-real time user,
i means a time slot of interest,
$\text{NRT\_share\_per\_TSL}^i$ is the amount of available capacity for non-real time use in a time slot.

5. The method of claim 1, wherein the averaging for determining a down link sub-block reservation rate is carried out by using the equation:

$$TBFreservationrateDL = \frac{\sum_{i=0}^{TSL_{total}} TBFreservationrate^i}{TSL_{total}},$$

where
TBF means temporary block flow,
$TSL_{total}$ means the number of time slots reserved for non-real time use,
i means a time slot of interest.

6. The method of claim 1, wherein the averaging for determining a down link sub-block reservation rate is carried out by using the equation:

$$TBFreservationrateDL = \frac{\sum_{i=0}^{TSL_{total}} \text{NRT\_share\_per\_TSL}^i \cdot TBFreservationrate^i}{\sum_{i=0}^{TSL_{total}} \text{NRT\_share\_per\_TSL}^i}$$

where
TBF means temporary block flow,
$TSL_{total}$ means the number of time slots reserved for non-real time use,
i means a time slot of interest, $\text{NRT\_share\_per\_TSL}^i$ is the amount of available capacity for non-real time use in a time slot.

7. The method of claim 1, wherein the sub-blocks comprise temporary block flow sub-blocks.

8. The method of claim 1, wherein the averaging is carried out for a group comprising time slots reserved for non-real time use in a cell.

9. A network element comprising:
means for dividing a time slot into a predetermined number of sub-blocks, means for defining an amount of available capacity for a non-real time use in a time slot,
means for defining a number of sub-blocks reserved by a real time use in a time slot,
means for defining a number of sub-blocks reserved by a non-real time use in a time slot,
means for defining a number of free sub-blocks in a time slot based on sub-blocks reserved by the real time use and the sub-blocks reserved by the non-real time use,
means for calculating a sub-block reservation rate for a time slot based on the number of free sub-blocks, the amount of available capacity for the non-real time use in the time slot and the number of sub-blocks in a time slot not reserved by real time use; and
means for averaging a sub-block reservation rate for a time slot to determine a down link sub-block reservation rate.

10. A network element comprising:
means for dividing a time slot into a predetermined number of sub-blocks, means for defining an amount of available capacity for a non-real time use in a time slot,
means for defining a number of sub-blocks reserved by a real time use in a time slot,
means for defining a number of sub-blocks reserved by a non-real time use in a time slot,
means for defining a number of free sub-blocks in a time slot based on the sub-blocks reserved by the real time use and the sub-blocks reserved by the non-real time use,
means for calculating a sub-block reservation rate for a time slot based on the number of free sub-blocks, the amount of available capacity for the non-real time use in the time slot and the number of sub-blocks in a time slot not reserved by real time use,
means for averaging a sub-block reservation rate for a time slot to determine a down link sub-block reservation rate; and
means for directing a transmission in a telecommunication system to less loaded cells or timeslots.

11. A network element configured to:
divide a time slot into a predetermined number of sub-blocks;
define an amount of available capacity for a non-real time use in a time slot;
define a number of sub-blocks reserved by a real time use in a time slot;
define a number of sub-blocks reserved by a non-real time use in a time slot;
define a number of free sub-blocks in a time slot based on sub-blocks reserved by the real time use and the sub-blocks reserved by the non-real time use;
calculate a sub-block reservation rate for a time slot based on the number of free sub-blocks the amount of available capacity for non-real time use in the time slot and the number of sub-blocks in a time slot not reserved by real time use; and
average a sub-block reservation rate for a time slot to get down link sub-block reservation rate.

12. A network element configured to:
divide a time slot into a predetermined number of sub-blocks,
define an amount of available capacity for a non-real time use in a time slot;
define a number of sub-blocks reserved by real time use in a time slot,
define a number of sub-blocks reserved by a non-real time use in a time slot;
define a number of free sub-blocks in a time slot based on sub-blocks reserved by the real time use and the sub-blocks reserved by the non-real time use;
calculate a sub-block reservation rate for a time slot based on the number of free sub-blocks, the amount of available capacity for the non-real time use and the number of sub-blocks in a time slot not reserved by real time use;
average a sub-block reservation rate for a time slot to determine a down link sub-block reservation rate; and
direct a transmission in a telecommunication system to less loaded cells or timeslots.

13. The network element of claim 12, wherein the amount of available capacity for the non-real time use in the time slot is defined by using the equation:

$$\text{NRT\_share\_per\_TSL}^i = \max\left(0, 1 - \frac{\sum_{j=0}^{M^i} GBR_j^i}{R_{rb\_est}^i}\right),$$

where
M=a number of real time users per timeslot having a guaranteed bit rate,
GBR means a guaranteed bit rate,
$R_{rb\_est}$=average bit rate per radio block in a time slot,
i means a time slot of interest.

14. The network element of claim 12, wherein the sub-block reservation rate for a time slot is defined by using the equation:

$$TBFreservationrate^i = 1 - \frac{9 - TBF_{RT}^i - TBF_{NRT}^i}{\frac{1}{\text{NRT\_share\_per\_TSL}^i} \cdot (9 - TBF_{RT}^i)},$$

where
TBF means temporary block flow,
RT means a real time user,
NRT means a non-real time user,
i means a time slot of interest,
NRT_share_per_TSL$^i$ is an amount of available capacity for non-real time use in a time slot.

15. The network element of claim 12, wherein the averaging for determining a down link sub-block reservation rate is carried out by using the equation:

$$TBFreservationrateDL = \frac{\sum_{i=0}^{TSL_{total}} TBFreservationrate^i}{TSL_{total}},$$

where
TBF means temporary block flow,
$TSL_{total}$ means a number of time slots reserved for the non-real time use,
i means a time slot of interest.

16. The network element of claim 12, wherein the averaging for determining a down link sub-block reservation rate is carried out by using the equation:

$$TBFreservationrateDL = \frac{\sum_{i=0}^{TSL_{total}} \text{NRT\_share\_per\_TSL}^i \cdot TBFreservationrate^i}{\sum_{i=0}^{TSL_{total}} \text{NRT\_share\_per\_TSL}^i}$$

where
TBF means temporary block flow,
$TSL_{total}$ means a number of time slots reserved for the non-real time use,
i means a time slot of interest,
NRT_share_per_TSL$^i$ is the amount of available capacity for the non-real time use in a time slot.

17. The network element of claim 12, wherein the sub-blocks comprise temporary block flow sub-blocks.

18. The network element of claim 12, wherein the averaging is carried out for a group comprising time slots reserved for non-real time use in a cell.

* * * * *